US009225510B1

(12) United States Patent
Wharton

(10) Patent No.: US 9,225,510 B1
(45) Date of Patent: Dec. 29, 2015

(54) WEBSITE SECURE CERTIFICATE STATUS DETERMINATION VIA PARTNER BROWSER PLUGIN

(75) Inventor: Kenneth Wharton, Peoria, AZ (US)

(73) Assignee: Go Daddy Operating Company, LLC, Scottsdale, AZ (US)

(*) Notice: Subject to any disclaimer, the term of this patent is extended or adjusted under 35 U.S.C. 154(b) by 1065 days.

(21) Appl. No.: 12/857,783

(22) Filed: Aug. 17, 2010

(51) Int. Cl.
*G06Q 30/00* (2012.01)
*H04L 9/00* (2006.01)

(52) U.S. Cl.
CPC .................................... *H04L 9/00* (2013.01)

(58) Field of Classification Search
CPC ........................................ G06Q 30/06–30/08
USPC ............................................... 705/26–27.2
See application file for complete search history.

(56) References Cited

U.S. PATENT DOCUMENTS

| | | | |
|---|---|---|---|
| 5,657,390 | A | 8/1997 | Elgamal et al. |
| 5,825,890 | A | 10/1998 | Elgamal et al. |
| 5,903,882 | A | 5/1999 | Asay et al. |
| 6,233,577 | B1 | 5/2001 | Ramasubramani et al. |
| 6,308,277 | B1 | 10/2001 | Vaeth |
| 6,370,249 | B1 | 4/2002 | Van Oorschot |
| 6,430,688 | B1 | 8/2002 | Kohl et al. |
| 6,981,139 | B2 | 12/2005 | Enokida |
| 7,003,661 | B2 | 2/2006 | Beattie et al. |
| 7,073,057 | B2 | 7/2006 | Moses et al. |
| 7,114,177 | B2 | 9/2006 | Rosenberg et al. |
| 7,120,929 | B2 | 10/2006 | Beattie et al. |
| 7,562,212 | B2 | 7/2009 | Beattie et al. |
| 2001/0011255 | A1 | 8/2001 | Asay et al. |
| 2001/0049786 | A1 | 12/2001 | Harrison et al. |
| 2002/0138725 | A1 | 9/2002 | Moses et al. |
| 2003/0023878 | A1 | 1/2003 | Rosenberg et al. |
| 2003/0028762 | A1 | 2/2003 | Trilli et al. |
| 2003/0065921 | A1 | 4/2003 | Chang |
| 2003/0115475 | A1 | 6/2003 | Russo et al. |
| 2003/0126431 | A1 | 7/2003 | Beattie et al. |
| 2004/0049675 | A1 | 3/2004 | Micali et al. |
| 2004/0068650 | A1 | 4/2004 | Resnitzky et al. |
| 2004/0148505 | A1 | 7/2004 | Qiu |
| 2004/0250075 | A1 | 12/2004 | Anthe et al. |
| 2005/0015586 | A1 | 1/2005 | Brickell et al. |
| 2005/0069136 | A1 | 3/2005 | Thornton et al. |
| 2005/0076199 | A1 | 4/2005 | Thornton et al. |
| 2005/0080899 | A1 | 4/2005 | Vogel et al. |

(Continued)

OTHER PUBLICATIONS

Myers, et al., RFC2560, "X.509 Internet Public Key Infrastructure. Online Certificate Status Protocol," Jun. 1999.

(Continued)

*Primary Examiner* — Ethan D Civan
(74) *Attorney, Agent, or Firm* — Quarles & Brady LLP

(57) ABSTRACT

Methods of the present inventions allow for determining website secure certificate status via a partner browser plugin. An exemplary method may comprise storing, on a server communicatively coupled to a network, a plugin configured to determine the secure certificate status of a website browsed in the browser. A request for the plugin, from a partner having a unique identifier, may be received at the server. The plugin may be coded with the partner's unique identifier and transmitted to the partner. The server subsequently may receive, from the plugin, the website's uniform resource locator and secure certificate status along with the partner's unique identifier, which may be used to identify the source of the data.

11 Claims, 10 Drawing Sheets

START

Store plugin on server
700

Receive request for plugin from partner
710

Code plugin with partner's unique identifier
720

Transmit coded plugin to partner
730

Receive URL, certificate status, and unique identifier from plugin
740

END

(56) References Cited

U.S. PATENT DOCUMENTS

| | | | | |
|---|---|---|---|---|
| 2005/0081026 | A1 | 4/2005 | Thornton et al. | |
| 2005/0125319 | A1 | 6/2005 | Johnson | |
| 2005/0172128 | A1 | 8/2005 | Little et al. | |
| 2005/0228998 | A1 | 10/2005 | Chan et al. | |
| 2005/0246534 | A1 | 11/2005 | Kirkup et al. | |
| 2006/0015716 | A1 * | 1/2006 | Thornton et al. | 713/155 |
| 2006/0015729 | A1 | 1/2006 | Novack et al. | |
| 2006/0047950 | A1 | 3/2006 | Thayer | |
| 2006/0047965 | A1 | 3/2006 | Thayer et al. | |
| 2006/0161644 | A1 | 7/2006 | Adelman et al. | |
| 2007/0022477 | A1 | 1/2007 | Larson | |
| 2008/0027809 | A1 * | 1/2008 | Storm | 705/14 |

OTHER PUBLICATIONS

Nystrom and Kaliski, RFC2986, “PKCS #10: Certification Request Syntax Specification,” Nov. 2000.

Aug. 17, 2012 Appeal Brief in related U.S. Appl. No. 12/857,799.

May 24, 2012 office action in related U.S. Appl. No. 12/857,799.

Jun. 27, 2012 office action in related U.S. Appl. No. 13/342,720.

Jun. 27, 2012 office action in related U.S. Appl. No. 13/406,250.

* cited by examiner

WEBSITE SECURE CERTIFICATE STATUS DETERMINATION VIA PARTNER BROWSER PLUGIN

CROSS REFERENCE TO RELATED PATENT APPLICATIONS

This patent application is related to U.S. patent application Ser. No. 12/857,799 entitled: "SYSTEMS FOR DETERMINING WEBSITE SECURE CERTIFICATE STATUS VIA PARTNER BROWSER PLUGIN" concurrently filed herewith and also assigned to Go Daddy Operating Company, LLC.

FIELD OF THE INVENTION

The present inventions generally relate to website secure certificates and, more particularly, systems and methods for determining website secure certificate status via partner browser plugins.

SUMMARY OF THE INVENTION

An example embodiment of a system for determining website secure certificate status via a partner browser plugin may comprise a server communicatively coupled to a network hosting a first website configured to receive a request for a plugin from a partner. The plugin may be configured to determine the secure certificate status of a second website browsed in a browser on the partner's computing device. The system further may comprise a plugin request processing module, perhaps running on the server, configured to receive a request for the plugin from the partner, code the plugin with a unique identifier identifying the partner, and transmit the coded plugin to the partner. A status receipt module, perhaps also running on the server, may be configured to receive, from the plugin, the second website's uniform resource locator and secure certificate status, and the partner's unique identifier. The status receipt module also may be configured to store the received data in a database running on the server.

An example embodiment of method for determining website secure certificate status via a partner browser plugin may comprise the steps of storing, on a server communicatively coupled to a network, a plugin configured to determine the secure certificate status of a website browsed in the browser. A request for the plugin, from a partner having a unique identifier, may be received at the server. The plugin may be coded with the partner's unique identifier and transmitted to the partner. The server subsequently may receive, from the plugin, the website's uniform resource locator and secure certificate status along with the partner's unique identifier, which may be used to identify the source of the data.

The above features and advantages of the present inventions will be better understood from the following detailed description taken in conjunction with the accompanying drawings.

DETAILED DESCRIPTION

Figure 1:
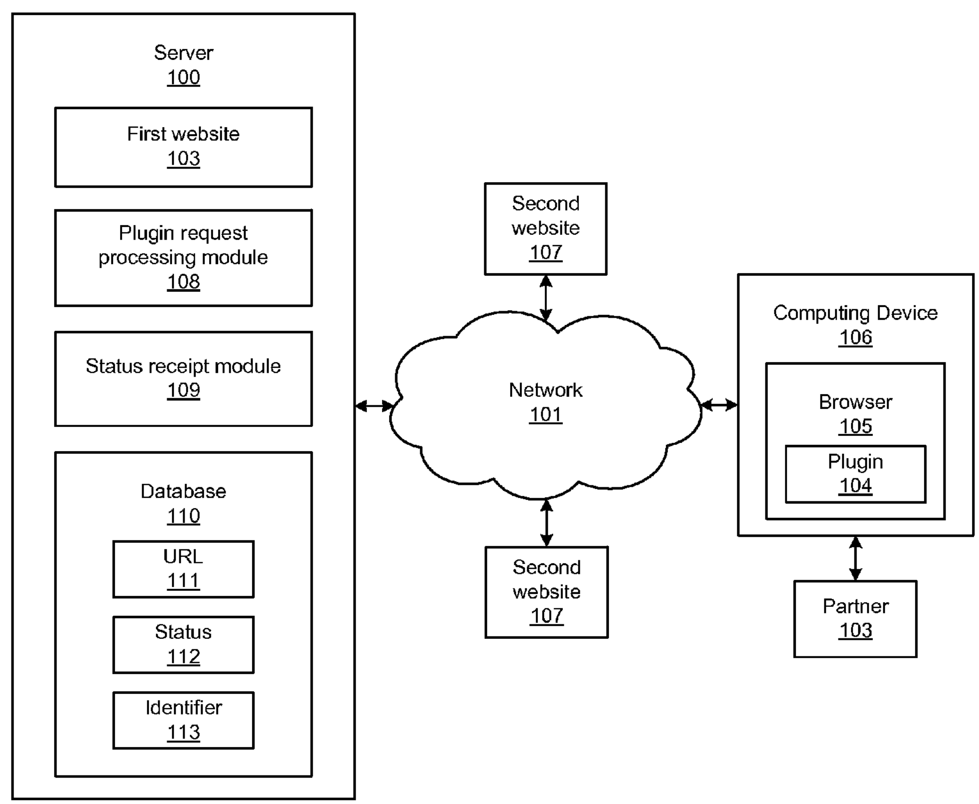
FIG. 1 illustrates a possible embodiment of a system for determining website secure certificate status via a partner browser plugin.

The present inventions will now be discussed in detail with regard to the attached drawing figures which were briefly described above. In the following description, numerous specific details are set forth illustrating the Applicant's best mode for practicing the inventions and enabling one of ordinary skill in the art to make and use the inventions. It will be obvious, however, to one skilled in the art that the present inventions may be practiced without many of these specific details. In other instances, well-known machines, structures, and method steps have not been described in particular detail in order to avoid unnecessarily obscuring the present inventions. Unless otherwise indicated, like parts and method steps are referred to with like reference numerals.

A network is a collection of links and nodes (e.g., multiple computers and/or other devices connected together) arranged so that information may be passed from one part of the network to another over multiple links and through various nodes. Examples of networks include the Internet, the public switched telephone network, the global Telex network, computer networks (e.g., an intranet, an extranet, a local-area network, or a wide-area network), wired networks, and wireless networks.

The Internet is a worldwide network of computers and computer networks arranged to allow the easy and robust exchange of information between computer users. Hundreds of millions of people around the world have access to computers connected to the Internet via Internet Service Providers (ISPs). Content providers place multimedia information (e.g., text, graphics, audio, video, animation, and other forms of data) at specific locations on the Internet referred to as webpages. Websites comprise a collection of connected, or otherwise related, webpages. The combination of all the websites and their corresponding webpages on the Internet is generally known as the World Wide Web (WWW) or simply the Web.

For Internet users and businesses alike, the Internet continues to be increasingly valuable. People increasingly use the Web for everyday tasks, from social networking, shopping, banking, and paying bills to consuming media and entertainment. E-commerce is growing, with businesses delivering more services and content across the Internet, communicating and collaborating online, and inventing new ways to connect with each other.

Prevalent on the Web are numerous websites, some of which may offer and sell goods and services to individuals and organizations. Websites may consist of a single webpage, but typically consist of multiple interconnected and related webpages. Websites, unless extremely large and complex or have unusual traffic demands, typically reside on a single server and are prepared and maintained by a single individual or entity. Menus and links may be used to move between different webpages within the website or to move to a different website as is known in the art. The interconnectivity of webpages enabled by the Internet can make it difficult for Internet users to tell where one website ends and another begins.

Such websites may be created using HyperText Markup Language (HTML) to generate a standard set of tags that define how the webpages for the website are to be displayed. Users of the Internet may access content providers' websites using software known as an Internet browser, such as MICROSOFT INTERNET EXPLORER or MOZILLA FIREFOX. After the browser has located the desired webpage, it requests and receives information from the webpage, typically in the form of an HTML document, and then displays the webpage content for the user. The user then may view other webpages at the same website or move to an entirely different website using the browser.

Some Internet users, typically those that are larger and more sophisticated, may provide their own hardware, software, and connections to the Internet. But many Internet users either do not have the resources available or do not want to create and maintain the infrastructure necessary to host their own websites. To assist such individuals (or entities), hosting companies exist that offer website hosting services. These hosting providers typically provide the hardware, software, and electronic communication means necessary to connect multiple websites to the Internet. A single hosting provider may literally host thousands of websites on one or more hosting servers.

Browsers are able to locate specific websites because each website, resource, and computer on the Internet has a unique Internet Protocol (IP) address. Presently, there are two standards for IP addresses. The older IP address standard, often called IP Version 4 (IPv4), is a 32-bit binary number, which is typically shown in dotted decimal notation, where four 8-bit bytes are separated by a dot from each other (e.g., 64.202.167.32). The notation is used to improve human readability. The newer IP address standard, often called IP Version 6 (IPv6) or Next Generation Internet Protocol (IPng), is a 128-bit binary number. The standard human readable notation for IPv6 addresses presents the address as eight 16-bit hexadecimal words, each separated by a colon (e.g., 2EDC:BA98:0332:0000:CF8A:000C:2154:7313).

IP addresses, however, even in human readable notation, are difficult for people to remember and use. A Uniform Resource Locator (URL) is much easier to remember and may comprise any name or address pointing to any computer, directory, file, webpage, website, database, or other resource accessible via a network such as the Internet. As a non-limiting example, the URL may comprise a Uniform Resource Identifier (URI), a Uniform Resource Name (URN), or any other set of characters used to identify a resource on the Internet. A browser is able to access a website on the Internet through the use of a URL. The URL may include a Hypertext Transfer Protocol (HTTP) request combined with the website's Internet address, also known as the website's domain name. An example of a URL with a HTTP request and domain name is: http://www.companyname.com. In this example, the "http" identifies the URL as a HTTP request and "companyname.com" as the domain name.

A user's interaction with a website may be more secure if a secure certificate is installed on the website. A secure certificate is an electronic document that may use a digital signature to bind together a public key with an entity (e.g., an individual, business, governmental entity, etc.). The secure certificate may be used to verify that a public key belongs to that entity. When issued to a website resolving from a domain name or URL, it may serve to verify that the domain name or URL is under that entity's control. As a non-limiting example, a secure certificate may comprise any digital certificate using the public key infrastructure, such as a Secure Sockets Layer (SSL) or Transport Layer Security (TLS) certificate.

SSL includes a protocol for transmitting private documents via the Internet by using a private key to encrypt data transferred over an SSL connection. An SSL certificate lets users know that a website's owner or operator has been verified by a trusted third party (a certificate authority) and that confidential communications with the website are encrypted. The SSL certificate typically includes an identification of the server hosting the website (such as its hostname), the server's public key, a digital signature provided by the Certificate Authority, the subject domain name or URL, the certificate's expiration date, and the individual or business to which the certificate has been issued.

Common conventional browsers, such as INTERNET EXPLORER or MOZILLA FIREFOX, support the SSL protocol, and many websites use the protocol to obtain confidential user information from their Customers. By convention, URLs that require an SSL connection start with "https:" instead of "http:." Whether a website is SSL-certified may indicate whether the entity having control of the website has been verified as the authorized controller of the website's domain name, is currently registered with a government authority, and/or legally exists as an incorporated corporation. SSL certificates are usually displayed on the website and typically indicate that the website utilizes at least some level of secure communications protocol.

Applicant has determined that presently-existing systems and methods for providing secure certificates to website operators do not provide optimal means for determining a website's secure certificate status (e.g., expired, soon-to-expire, or otherwise invalid) and utilizing such information to market or otherwise provide secure certificates to website operators. For these reasons, there is a need for the systems and methods for determining website secure certificate status via a partner browser plugin (and related functionality) as described herein.

Systems for Determining Website Secure Certificate Status Via a Partner Browser Plugin.

FIG. 1 illustrates an example embodiment of a system for determining website secure certificate status via a partner browser plugin. The illustrated system may comprise at least one server computer 100 communicatively coupled to a network 101 hosting a first website 103 configured to receive a request from a partner 103 for a plugin 104 configured to (when installed on a browser 105 running on a computing device 106) determine a secure certificate status of a second website 107 browsed in the browser 105; a plugin request processing module 108 running on one or more of the at least one server computer 100 configured to: i) receive the request from the partner 103 for the plugin 104; ii) code the plugin 104 with a unique identifier 113 for the partner 103; and iii) transmit the plugin 104 coded with the unique identifier 113 to the partner 103; a status receipt module 109 running on one or more of the at least one server computer 100 configured to: i) receive from the plugin 104: a) a uniform resource locator 111 for the second website 107 having the secure certificate status determined by the plugin 104; b) the secure certificate status 112; and c) the unique identifier 113 for the partner 103; and ii) store in association the uniform resource locator 111, the secure certificate status 112, and the unique identifier 113 in a database 110 running on one of more of the at least one server computer 100.

The example embodiments herein place no limitation on network 101 configuration or connectivity. Thus, as non-limiting examples, the network 101 could comprise the Internet, the public switched telephone network, the global Telex network, computer networks (e.g., an intranet, an extranet, a local-area network, or a wide-area network), wired networks, wireless networks, or any combination thereof.

Servers 100 may be communicatively coupled to the network 101 via any method of network connection known in the art or developed in the future including, but not limited to wired, wireless, modem, dial-up, satellite, cable modem, Digital Subscriber Line (DSL), Asymmetric Digital Subscribers Line (ASDL), Virtual Private Network (VPN), Integrated Services Digital Network (ISDN), X.25, Ethernet, token ring, Fiber Distributed Data Interface (FDDI), IP over Asynchronous Transfer Mode (ATM), Infrared Data Association (IrDA), wireless, WAN technologies (T1, Frame Relay), Point-to-Point Protocol over Ethernet (PPPoE), and/or any combination thereof.

As non-limiting examples, the servers 100 could comprise application, communication, mail, database, proxy, fax, file, media, web, peer-to-peer, standalone, software, or hardware servers (e.g., server computers) and may use any server format known in the art or developed in the future (possibly a shared hosting server, a virtual dedicated hosting server, a dedicated hosting server, or any combination thereof). Computing devices 106 that may be used to connect to the network 101 may include additional server(s) 100 or client(s) such as a desktop computer, a laptop computer, a hand held computer, a terminal, a television, a television set top box, a cellular phone, a wireless phone, a wireless hand held device, an Internet access device, a rich client, thin client, or any other client functional with a client/server computing architecture.

The first website 103 hosted on the server 100 (and any other website described herein) may comprise any collection of data and/or files accessible, perhaps via a computing device 106 communicatively coupled to a network 101. It may be configured (e.g., programmed) to receive a request from a partner 103 for a plugin 104, perhaps by displaying a virtual button entitled "request plugin" that, when "clicked" by a partner 103, transmits a HTTP request to the server 100 for the plugin 104. The request may comprise any electronic communication including, but not limited to, a HTTP request/response, email message, Short Message Service (SMS) message (e.g., text message), and/or a function call/response to/from an Application Programming Interface (API) running on a server 100.

An API is a software-to-software interface that specifies the protocol defining how independent computer programs interact or communicate with each other. The API may comprise an interface running on a server 100 that supports function calls, perhaps made by the partner's 103 computing device 106 seeking a plugin 104 for installation on the browser 105. The API may comprise any API type known in the art or developed in the future including, but not limited to, request-style, Berkeley Sockets, Transport Layer Interface (TLI), Representational State Transfer (REST), Simple Object Access Protocol (SOAP), Asynchronous JavaScript and XML (AJAX), Remote Procedure Calls (RPC), Structured Query Language (SQL), file transfer, message delivery, and/or any combination thereof.

The partner 103 may comprise any individual or entity that uses a browser 105 on a computing device 106 to browse websites 107. As a non-limiting example, the partner 103 may comprise a participant in a domain registrar and/or a certificate authority affiliate program. Such participants may join an affiliate program, promote the domain registrar or certificate authorities' products and services (e.g., domain name registration, hosting services, SSL certificates, and/or other eCommerce solutions), and subsequently receive remuneration (e.g., commission) for sales tracked to the participant's promotion. In such a program, partners 103 may be assigned a unique identifier 113 (perhaps an affiliate member number, or some other uniquely recognizable file or code) that may be used to track such sales to the partner 103.

The plugin 104 may comprise any software and/or script that, when installed, adds specific, customized functionality to a larger software application, such as a browser 105, perhaps by interfacing (e.g., via a function call) with a host application via an API running on a server 100. Alternatively, it may comprise a self-sufficient software module running within the browser 105 environment. The plugin 104 may comprise any add-on software component known in the art including, but not limited to, snap-ins, plug-ins, extensions, and/or themes. It may be installed on a browser 105 and configured (e.g., programmed) to determine the secure certificate status 112 of a website 107 browsed in the browser 105 on the partner's 103 computing device 106. The website 107 may comprise any webpage or website resolving from a URL, perhaps one that has an installed secure certificate, engages in eCommerce, receives sensitive data, or otherwise would benefit from a secure certificate.

As non-limiting examples, the secure certificate status 112 determined by the plugin 104 may include statuses 112 indicating that the website's 107 secure certificate (perhaps a SSL certificate) is nonexistent, expired, soon-to-expire, improperly installed, sourced from a non-trusted certificate authority, comprised of a non-matching public and private key pair, or otherwise invalid. Such statuses 112 may be determined, as non-limiting examples, by reading the data (e.g., expiration date) in the certificate itself, determining whether the browser 105 is securely communicating with the website 107, or analyzing browser 105 error messages (e.g., invalid secure certificate).

The plugin 104 also may be configured (e.g., programmed) to transmit (perhaps to a certificate authority via any of the data transmission protocols discussed herein) a uniform resource locator 111 for a website 107 having a secure certificate status 112 determined by the plugin 104, the secure certificate status 112, and the unique identifier 113 for the partner 103. Other information, such as the date and/or time that a determination is made, also may be transmitted by the plugin 104. As non-limiting examples, the plugin 104 may transmit data at regular intervals, every time a secure certificate status determination is made, or at any other time. Alternatively, the plugin 104 may store in local memory (e.g., browser 105 cache or computing device 106 memory) a history of visited websites 107 and their respective statuses 112 and transmit only the status 112 of newly-visited websites 107 and/or statuses 107 for previously-visited websites 107 having statuses 112 that have changes since the browser's 105 last visit.

The illustrated systems also may comprise a plugin request processing module 108, which (along with each module described elsewhere in this application) may comprise a self-contained software component that may interact with the larger system and/or other modules. A module may comprise an individual (or plurality of) file(s) and may execute a specific task within a larger software and/or hardware system. As a non-limiting example, a module may comprise any software and/or scripts running on at least one server 100 containing instructions (perhaps stored in computer-readable media accessible by the server's 100 computer processor) that, when executed by the computer processor, cause the server 100 to perform the steps for which the module is configured.

The plugin request processing module 108 may be configured (e.g., programmed) to: i) receive the request from the partner 103 for the plugin 104 (as described above); ii) code the plugin 104 with a unique identifier 113 for the partner 103; and iii) transmit the plugin 104 coded with the unique identifier 113 to the partner 103. The plugin request processing module 108 may be configured to receive the described data via any method of data receipt described above (e.g., HTTP request/response, email message, SMS message, and/or a function call/response to/from an API). Thus, it may comprise any electronic communication interface capable of receiving such requests (e.g., web, email, or SMS server software, or an API).

The plugin 104 may be coded with the unique identifier 113 via any method known in the art or developed in the future of encoding a piece of software with a marker indicating that use of the software (e.g., plugin 104) is uniquely traceable to the partner 103. As a non-limiting example, the plugin 104 may be coded by adding the partner's 103 affiliate member number in a line of code of the plugin 104, perhaps by setting a variable to equal the partner's 103 affiliate member number.

The plugin 104 coded with the unique identifier 113 may be transmitted to the partner 103 according to any data transmission protocol known in the art or developed in the future including, but not limited to an HTTP response to the request, a file transfer protocol (FTP) transmission, an email message, and/or a SMS message. Viable data transfer methods can generally be classified in two categories: (1) "pull-based" data transfers where the receiver initiates a data transmission request; and (2) "push-based" data transfers where the sender initiates a data transmission request. Both types are expressly included in the embodiments illustrated herein, which also may include transparent data transfers over network file systems, explicit file transfers from dedicated file-transfer services like FTP or HTTP, distributed file transfers over peer-to-peer networks, file transfers over instant messaging systems, file transfers between computers and peripheral devices, and/or file transfers over direct modem or serial (null modem) links, such as XMODEM, YMODEM and ZMODEM. Data streaming technology also may be used to effectuate data transfer. A data stream may be, for example, a sequence of digitally encoded coherent signals (packets of data) used to transmit or receive information that is in transmission. Any data transfer protocol known in the art or developed in the future may be used including, but not limited to: (1) those used with TCP/IP (e.g., FTAM, FTP, HTTP, RCP, SFTP, SCP, or FASTCopy); (2) those used with UDP (e.g., TFTP, FSP, UFTP, or MFTP); (3) those used with direct modem connections; (4) HTTP streaming; (5) Tubular Data Stream Protocol (TDSP); (6) Stream Control Transmission Protocol (SCTP); and/or (7) Real Time Streaming Protocol (RTSP).

The illustrated systems also may comprise a status receipt module 109 configured (e.g., programmed) to receive (perhaps from the plugin 104) a uniform resource locator 111 for the second website 107 having the secure certificate status 112 determined by the plugin 104, the secure certificate status 112, and the unique identifier 113 for the partner 103. Other information, such as the date and/or time that a determination is made, also may be received. This system component may communicate with the plugin 104 (once installed on the partner's 103 browser 105) and receive the results of the plugin's 104 website 107 secure certificate status 112 monitoring. The status receipt module 109 may be configured (e.g., programmed) to receive the described data via any method of data receipt described above (e.g., HTTP request/response, email message, SMS message, and/or a function call/response to/from an API).

The status receipt module 109 further may be configured (e.g., programmed) to store in association the uniform resource locator 111, the secure certificate status 112, and the unique identifier 113 in a database 110. Structurally, the database 110 may comprise any collection of data accessible via the network 101. As non-limiting examples, the database 110 may comprise a local database, online database, desktop database, server-side database, relational database, hierarchical database, network database, object database, object-relational database, associative database, concept-oriented database, entity-attribute-value database, multi-dimensional database, semi-structured database, star schema database, XML database, file, collection of files, spreadsheet, and/or other means of data storage located on at least one server 100, a computer, a client, another server, or any other network storage device.

Figure 2:
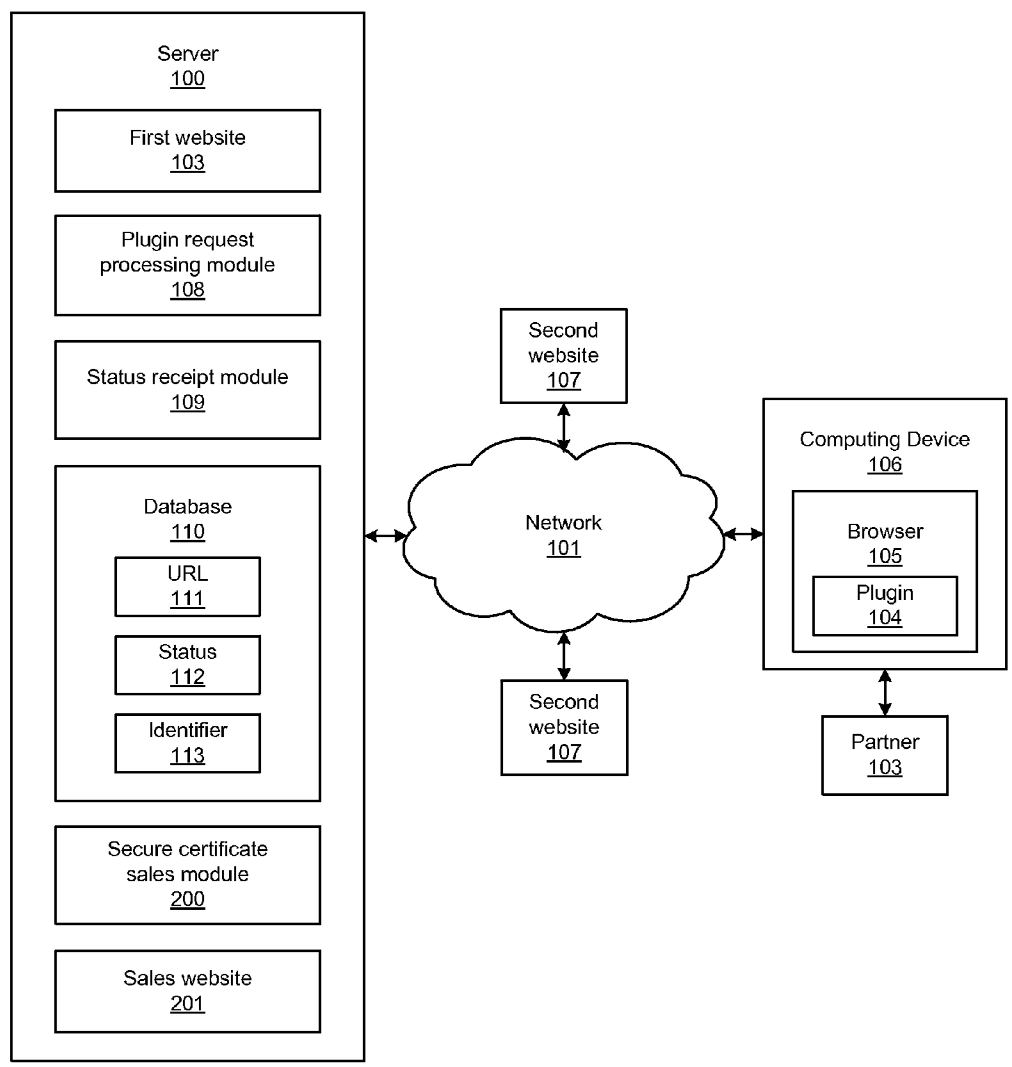
FIG. 2 illustrates a possible embodiment of a system for determining website secure certificate status via a partner browser plugin.

FIG. 2 illustrates an example embodiment that builds upon the system shown in FIG. 1 and further comprises a sales website 201 hosted on the server 100. The sales website 201 may provide users with access to the data (uniform resource locator 111, secure certificate status 112, and/or unique identifier 113) stored in the database 110, perhaps to contact the website 107 owner or operator to provide secure-certificate related services, perhaps to remedy a secure certificate defect determined by the plugin 104. As a non-limiting example, the website 107 owner or operator may be determined by querying the WHOIS database. The sales website 201 may be access-protected, perhaps via a username/password combination, to ensure that only properly-authenticated users (e.g., sales personnel for the plugin-providing certificate authority) may access the data.

This illustrated embodiment also may comprise a secure certificate sales module 200 running on the server 100. This module may be configured (e.g., programmed) to sell and/or otherwise provide secure certificate-related services to an individual or an entity having control of the subject website 107. As a non-limiting example, the secure certificate sales module 200 may comprise a software and/or scripts that, when executed by the server's 100 processor, contacts an owner or operator of a website 107 (the website 107 owner or operator may be determined by querying the WHOIS database) with an offer to provide a valid secure certificate, receives a request for a secure certificate and a certificate signing request from a website owner or operator, verifies that the website 107 is actually controlled by the owner or operator, generates and transmits the secure certificate to the owner or operator, and collects payment.

The secure certificate sales module 200 further may be configured to pay a remuneration to the partner 103 after a secure certificate is sold to the individual or entity having control of the second website 107. The remuneration may comprise any financial payment including, but not limited to, a percentage share of the secure certificate sales price, a fixed fee, and/or a periodic payment for being a partner 103 (e.g., an affiliate member) and may be paid via electronic funds transfer, perhaps to the partner's 103 banking account. Alternatively, the partner 103 may be paid in any conventional manner including, but not limited to, mailing a check.

Figure 3:
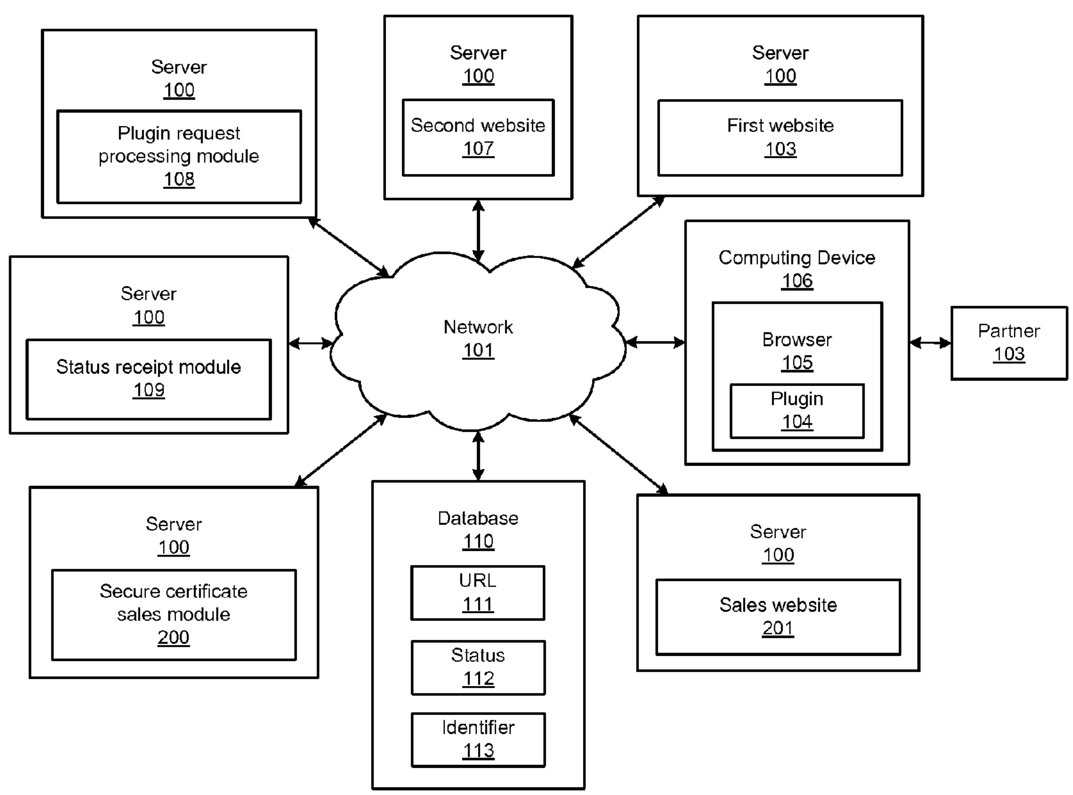
FIG. 3 illustrates a possible embodiment of a system for determining website secure certificate status via a partner browser plugin.

FIG. 3 illustrates a highly-distributed embodiment of a system for determining website secure certificate status via a partner browser plugin, wherein the first website 103, second website 107, plugin request processing module 108, status receipt module 109, secure certificate sales module 200, sales website 201, and database 110 are each hosted on separate servers 100, each of which is communicatively coupled to the network 101. The claimed embodiments are not limited to those illustrated in the figures. For example, the described modules may all run on a single server 100, each may run on an independent server 100, or the modules may be sub-divided with a plurality running on one server 100 and another plurality running on other servers 100.

Figure 4:
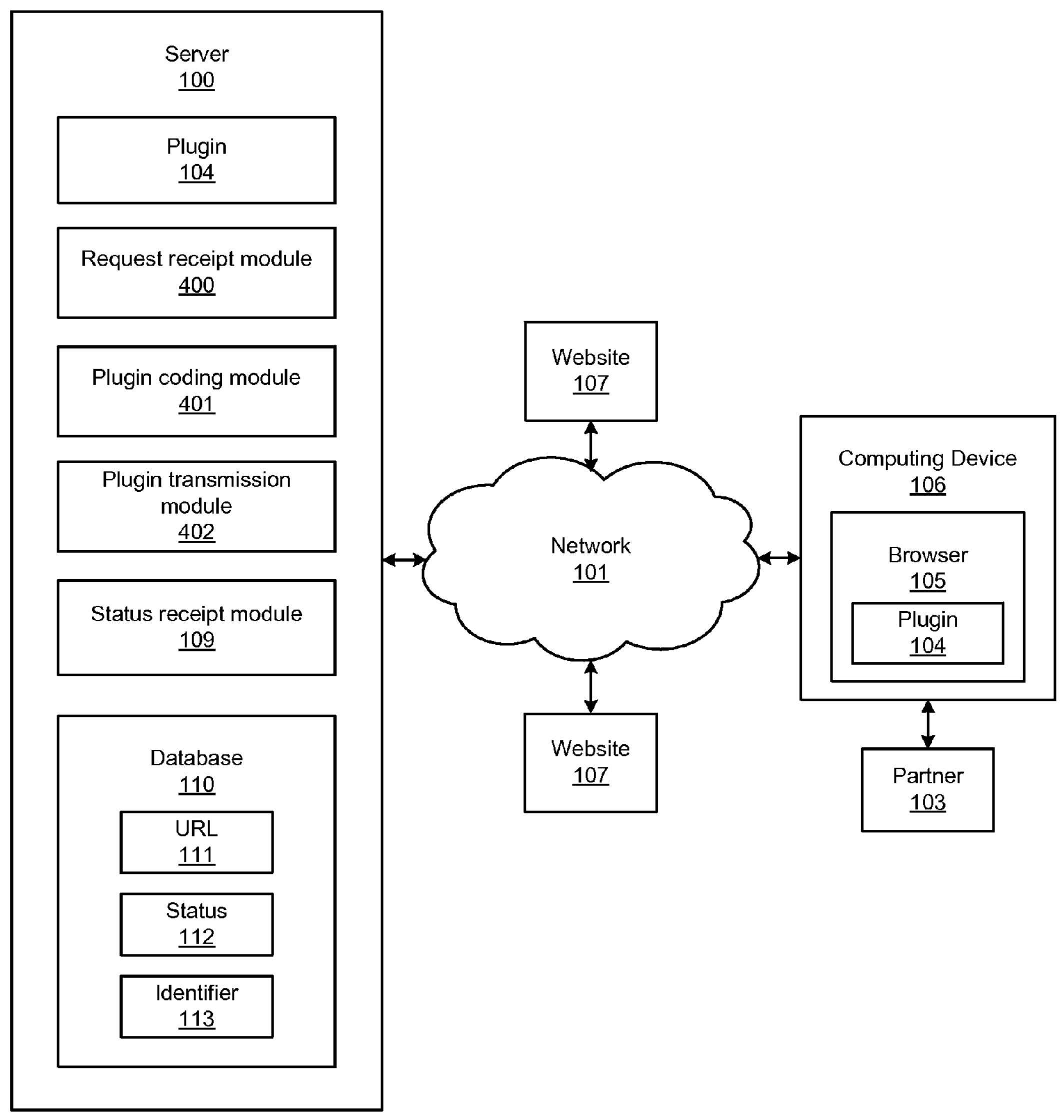
FIG. 4 illustrates a possible embodiment of a system for determining website secure certificate status via a partner browser plugin.

FIG. 4 illustrates another embodiment of a system for determining website secure certificate status via a partner browser plugin. The illustrated system may comprise at least one server computer 100 communicatively coupled to a network 101 storing in a memory: i) a plugin 104 configured to, when installed on a browser 105 running on a computing device 106, determine a secure certificate status 112 of a website 107 browsed in the browser 105; ii) a request receipt module 400 configured to receive a request from a partner 103 for the plugin 104; iii) a plugin coding module 401 configured to code the plugin 104 with a unique identifier 113 for the partner 103; iv) a plugin transmission module 402 configured to transmit the plugin 104 coded with the unique identifier 113 to the partner 103; and v) a status receipt module 109 configured to receive from the plugin 104: a) a uniform resource locator 111 for the website 107 having the secure certificate status 112 determined by the plugin 104; b) the secure certificate status 112; and c) the unique identifier 113 for the partner 103. The system also may comprise a database 110 running on one of more of the at least one server computer 100, the database 110 storing in association the uniform resource locator 111, the secure certificate status 112, and the unique identifier 113.

FIG. 4 illustrates that the plugin 104 may be stored on a server 100 for download to a partner's 103 computing device 106, perhaps via the data transfer mechanisms described in detail above. In addition to the system elements described in detail above, the illustrated embodiment also may comprise a request receipt module 400, which may comprise software and or scripts running on the server 100 that, when executed by the server's 100 microprocessor, cause the server 100 to receive a request from a partner 103 for a plugin 104. The request may comprise any electronic communication including, but not limited to, HTTP request/response, email message, SMS message (e.g., text message), and/or a function call/response to/from an API running on a server 100. Thus, the request receipt module 400 may comprise any electronic communication interface capable of receiving such requests (e.g., email or SMS server software, or an API).

The plugin coding module 401 may comprise software and or scripts running on the server 100 that, when executed by the server's 100 microprocessor, cause the server 100 to code the plugin 104 with the unique identifier 113 via any method known in the art or developed in the future of encoding a piece of software with a marker indicating that use of the software (e.g., plugin 104) is uniquely traceable to the partner 103. As a non-limiting example, the plugin 104 may be coded by adding the partner's 103 affiliate member number in a line of code of the plugin 104, perhaps by setting a variable to equal the partner's 103 affiliate member number.

The plugin transmission module 402 may comprise software and or scripts running on the server 100 that, when executed by the server's 100 microprocessor, cause the server 100 to transmit the plugin 104 coded with the unique identifier 113 to the partner 103 according to any data transmission protocol described above.

Figure 5:
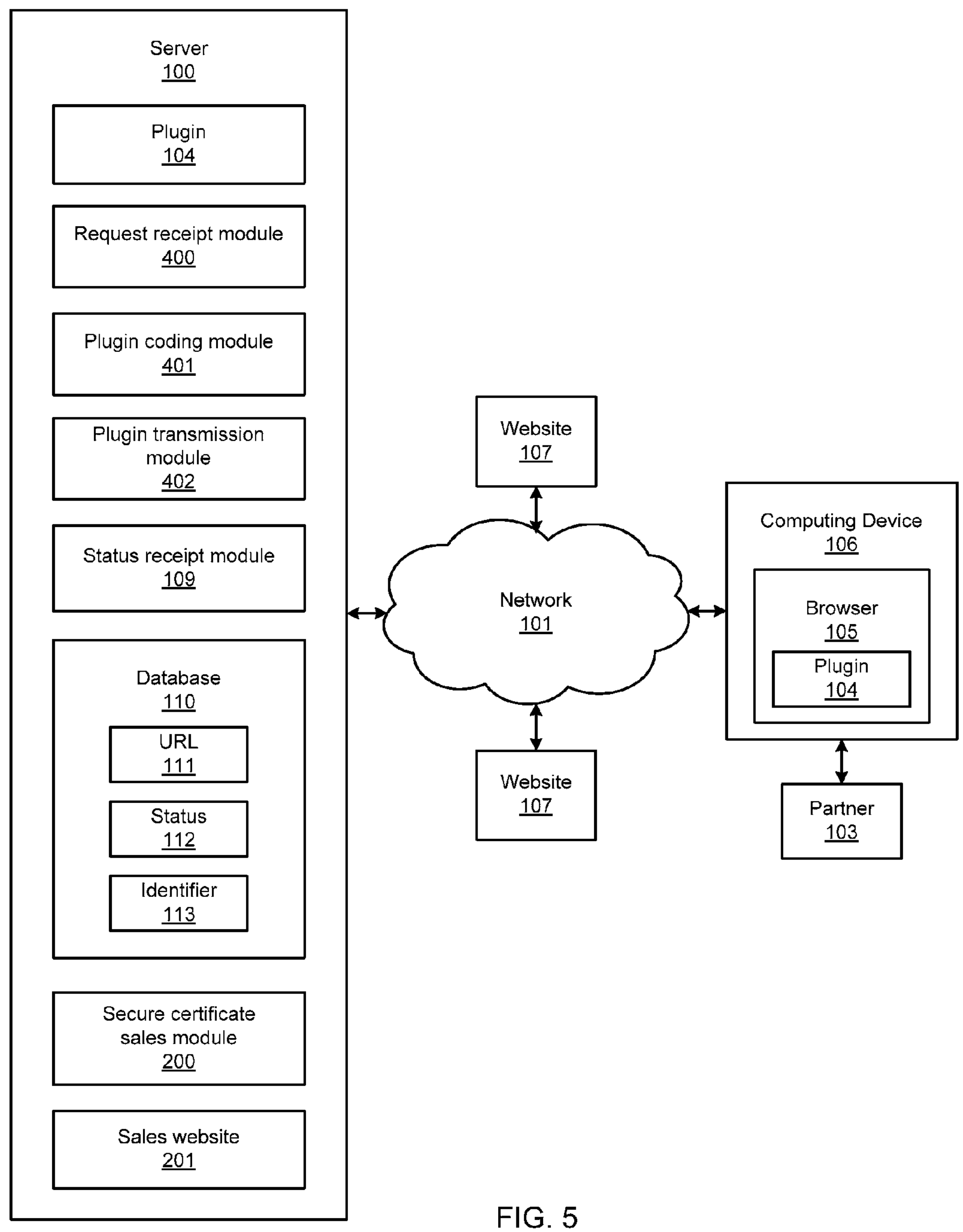
FIG. 5 illustrates a possible embodiment of a system for determining website secure certificate status via a partner browser plugin.

FIG. 5 illustrates an example embodiment that builds upon the system shown in FIG. 4 and further comprises a sales website 201 and a secure certificate sales module 200 (both described in detail above) hosted on the server 100.

Figure 6:
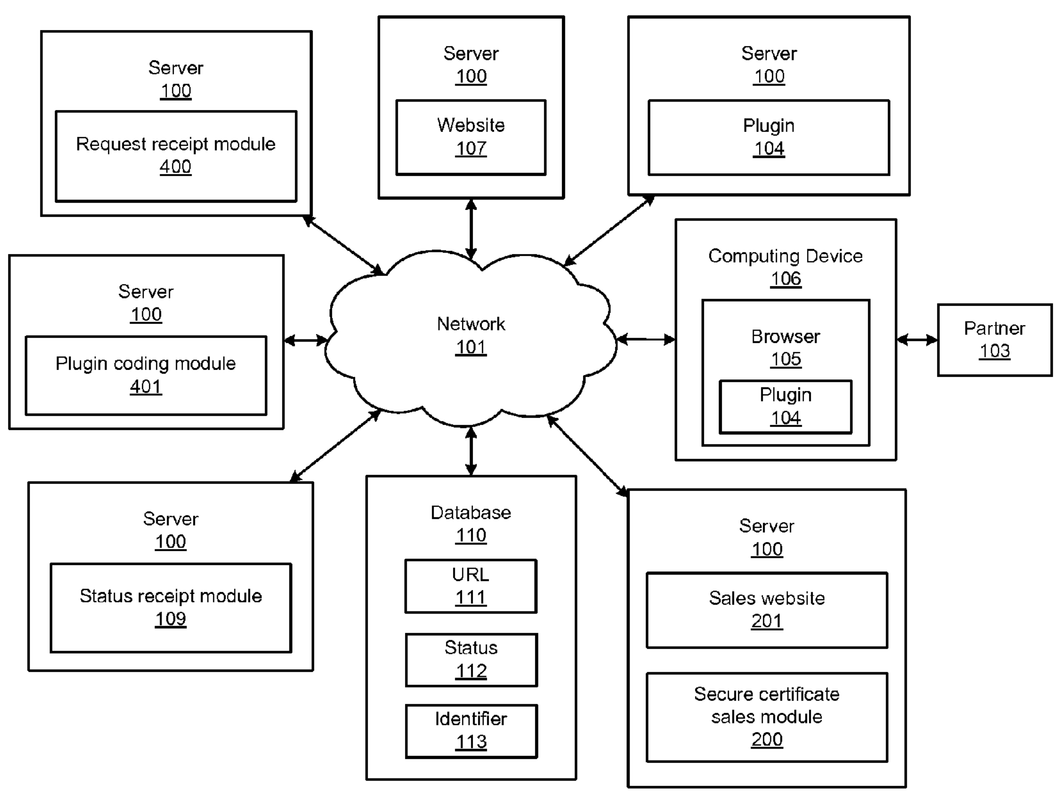
FIG. 6 illustrates a possible embodiment of a system for determining website secure certificate status via a partner browser plugin.

FIG. 6 illustrates a highly-distributed embodiment of a system for determining website secure certificate status via a partner browser plugin, wherein the plugin 104, website 107, request receipt module 400, plugin coding module 401, status receipt module 109, secure certificate sales module 200, sales website 201, and database 110 are each hosted on separate servers 100, each of which is communicatively coupled to the network 101. The claimed embodiments are not limited to those illustrated in the figures. For example, the described modules may all run on a single server 100, each may run on an independent server 100, or the modules may be sub-divided with a plurality running on one server 100 and another plurality running on other servers 100.

Methods for Determining Website Secure Certificate Status Via a Partner Browser Plugin.

Figure 7:
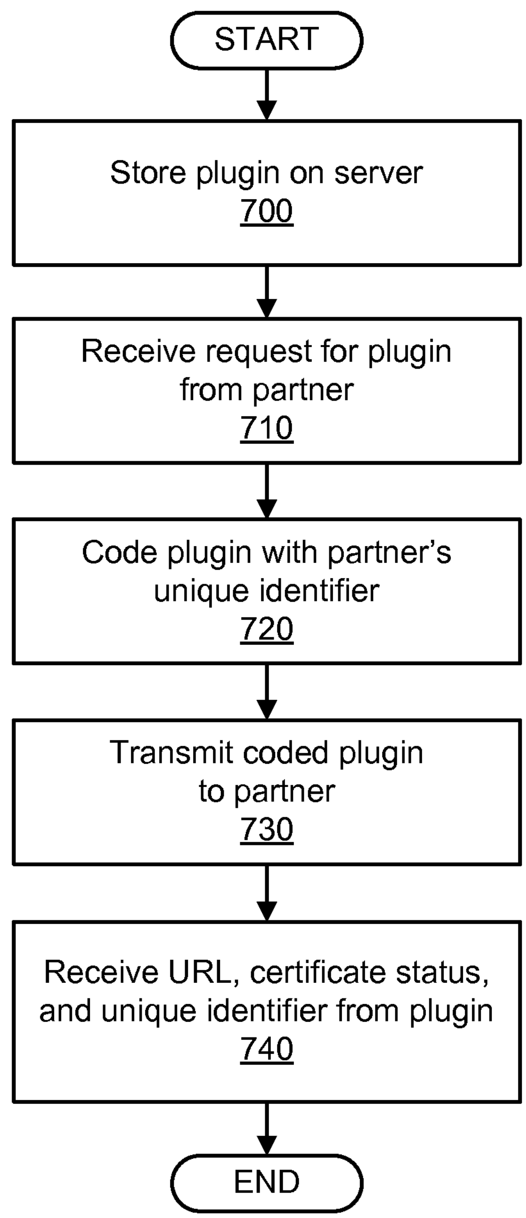
FIG. 7 is a flow diagram illustrating a possible embodiment of a method for determining website secure certificate status via a partner browser plugin.

FIG. 7 illustrates an example embodiment of a method for determining website secure certificate status via a partner browser plugin. The illustrated method may comprise the steps of storing, on at least one server computer 100 communicatively coupled to a network 101, a plugin 104 configured to, when installed on a browser 105 running on a computing device 106, determine a secure certificate status 112 for a website 107 browsed in the browser 105 (Step 700); receiving, by one of more of the at least one server computer 100, a request from a partner 103 for the plugin 104, the partner 103 having a unique identifier 113 (710); coding, by one of more of the at least one server computer 100, the plugin 104 with the unique identifier 113 for the partner 103 (Step 720); transmitting, by one of more of the at least one server computer 100, the plugin 104 coded with the unique identifier 113 to the partner 103 (Step 730); and receiving, by the server computer 100 and from the plugin 104: i) a uniform resource locator 111 for the website 107 having the secure certificate status 112 determined by the plugin 104; ii) the secure certificate status 112; and iii) the unique identifier 113 for the partner 103 (Step 740).

The plugin 104 may be stored (Step 700) on any server 100 or network storage device accessible to a partner's 103 computing device 106 via a network 101. A request for the plugin 104 then may be received (Step 710), perhaps from a partner 103 that may be an affiliate program member. Perhaps consistent with the terms of the affiliate program, the partner 103 may have a unique identifier 113 assigned, such as a membership number. The plugin 104 request may be received (Step 710) by any method of receiving a request known in the art or developed in the future including, but not limited to, receiving an electronic communication, a telephone communication, an in-person, communication, or a written communication. As a non-limiting example, a first website 103 hosted on a server 100 may be configured (e.g., programmed) to receive a request from a partner 103 for a plugin 104 (Step 710), perhaps by displaying a virtual button entitled "request plugin" that, when "clicked" by a partner 103, transmits a HTTP request to the server 100 for the plugin 104. Alternatively, the request may comprise any electronic communication including, but not limited to, an email message, SMS message (e.g., text message), and/or a function call on an API running on a server 100.

The plugin 104 then may be coded with the partner's 103 unique identifier 113 (Step 720). This step may allow for tracking the source of data subsequently transmitted from the plugin 104 (e.g., Step 730) and may be accomplished via any method known in the art or developed in the future of encoding a piece of software with a marker indicating that use of the software (e.g., plugin 104) is uniquely traceable to the partner 103. As a non-limiting example, the plugin 104 may be coded by adding the partner's 103 affiliate member number in a line of code of the plugin 104, perhaps by setting a variable to equal the partner's 103 affiliate member number.

The plugin 104 coded with the unique identifier 113 then may be transmitted to the partner 103 (Step 730) according to any data transmission protocol known in the art or developed in the future, including those described in detail above. As a non-limiting example, where an HTTP plugin request is received (Step 710) from a partner 103 via a certificate authority or domain registrar's affiliate website (e.g., first website 103), an HTTP response to the request may be transmitted along with a hyperlink to the plugin 104 (stored on the server 100) allowing the partner 103 to download the plugin 104 to his computing device 106. Once the plugin 104 is received by the partner 103 and installed on the browser 105 of the partner's 103 computing device 106, it may determine the secure certificate status 112 of websites 107 browsed by the partner 103 and transmit data back to the server 100. (See Steps 900-940, described in detail below with respect to FIGS. 9 and 10). A uniform resource locator 111 for the website 107 having the secure certificate status 112 determined by the plugin 104, the secure certificate status 112, the unique identifier 113 for the partner 103 then may be received from the plugin (Step 740), perhaps by the status receipt module 109 running on a server 100 as described in detail above. Other information, such as the date and/or time that a determination is made, also may be transmitted by the plugin 104.

Figure 8:
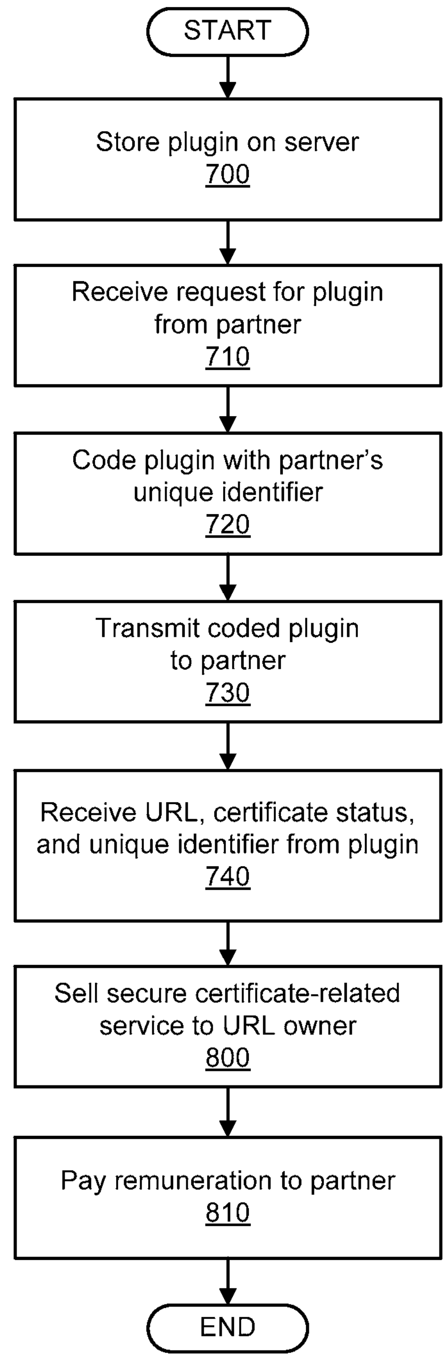
FIG. 8 is a flow diagram illustrating a possible embodiment of a method for determining website secure certificate status via a partner browser plugin.

FIG. 8 illustrates an example embodiment that builds upon the method shown in FIG. 7 and further comprises the steps of selling a secure certificate-related service to an individual or an entity having control of the website 107 (Step 800) and paying a remuneration to a partner 103 after selling the secure certificate-related service (Step 810), perhaps by the secure certificate sales module 200 as described in detail above.

As a non-limiting example, step 800 may be accomplished by contacting (via any known method) an owner or operator of the website 107 (the website 107 owner or operator may be determined by querying the WHOIS database) with an offer to provide a valid secure certificate, receiving a request for a secure certificate and a certificate signing request from the website 107 owner or operator, verifying that the website 107 is actually controlled by the owner or operator, generating and transmitting the secure certificate to the owner or operator, and collecting payment.

Step 810 may be accomplished, as a non-limiting example, by paying a remuneration to the partner 103 after the secure certificate is sold to the individual or entity having control of the website 107. The remuneration may comprise any financial payment including, but not limited to, a percentage share of the secure certificate sales price, a fixed fee, and/or a periodic payment for being a partner 103 (e.g., an affiliate member) and may be paid via electronic funds transfer, perhaps to the partner's 103 banking account. Alternatively, the partner 103 may be paid in any conventional manner including, but not limited to, mailing a check.

Figure 9:
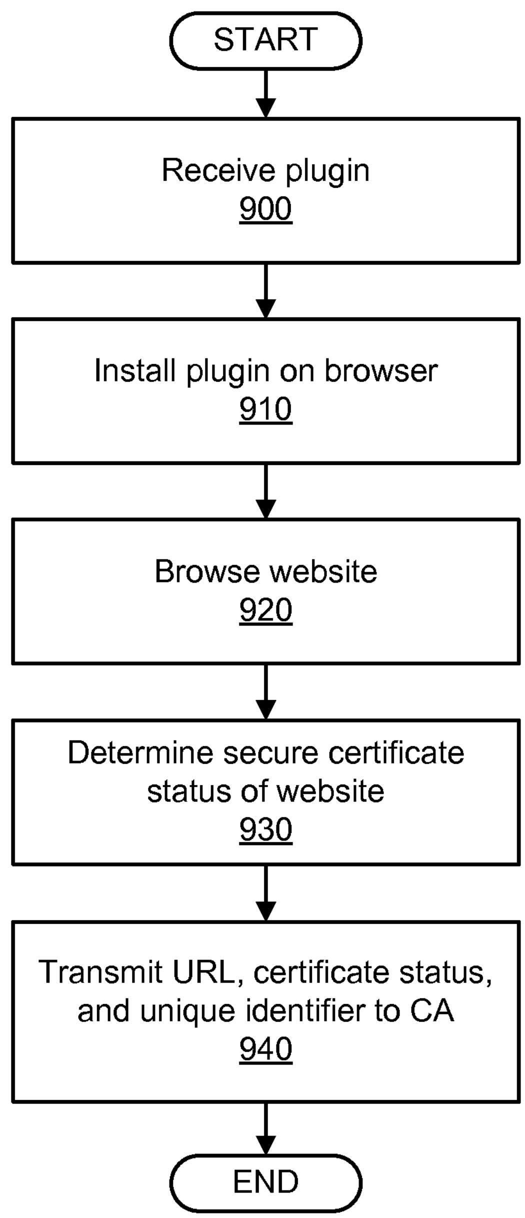
FIG. 9 is a flow diagram illustrating a possible embodiment of a method for determining website secure certificate status via a partner browser plugin.

FIG. 9 illustrates a partner 103-side embodiment of a method for determining website secure certificate status via a partner browser plugin. The illustrated method may comprise the steps of receiving, perhaps by a computing device 106 communicatively coupled to a network 101, a plugin 104 configured to (when installed on a browser 105 running on a computing device 106) determine a secure certificate status 112 for a website 107 browsed in the browser 105 (Step 900). The plugin 104 may further comprise a unique identifier 113 identifying the computing device 106 on which it is installed. The illustrated method may further comprise installing, perhaps by the computing device 106, the plugin 104 on the browser 105 (Step 910); browsing, perhaps by the browser 105, at least one website 107 (Step 920); determining, perhaps by the plugin 104, the secure certificate status 112 of the website(s) 107 (Step 930); and transmitting to a certificate authority, perhaps by the plugin and/or the computing device 106: i) a uniform resource locator 111 for the website(s) 107, ii) the determined secure certificate status 112 for the website (s) 107, and iii) the unique identifier 113.

The plugin 104 may be received (Step 900) by any method known in the art or developed in the future of receiving software including, but not limited to receiving an electronic communication (e.g., email, SMS, HTTP request/response, and/or function call/response to/from an API) transmitting the plugin 104. As a non-limiting example, a computing device 106, perhaps via a browser 105, may receive an HTTP response to a previously-transmitted request (e.g., Step 1000 of FIG. 10). The HTTP response may be received along with a hyperlink to the plugin 104 (stored on a server 100) enabling the computing device 106 to download the plugin 104 and install it on a browser 105 (Step 910).

As websites 107 are browsed in the browser 105 (Step 920), perhaps by the partner 103 (or anyone using the partner's 103 computing device 106), the plugin 104 may determine the secure certificate status 112 of the website(s) 107 as described in detail above. The plugin 104 then may transmit a uniform resource locator 111 for the website(s) 107, the website(s)' secure certificate status 112, and the unique identifier 113 for the partner 103. The plugin 104 may be configured (e.g., programmed) to transmit the described data via any method of data receipt described above (e.g., HTTP request/response, email message, SMS message, and/or a function call/response on an API). This data may then be stored in a database 110, perhaps only accessible by property-authenticated sales personnel of a certificate authority or domain registrar.

Figure 10:
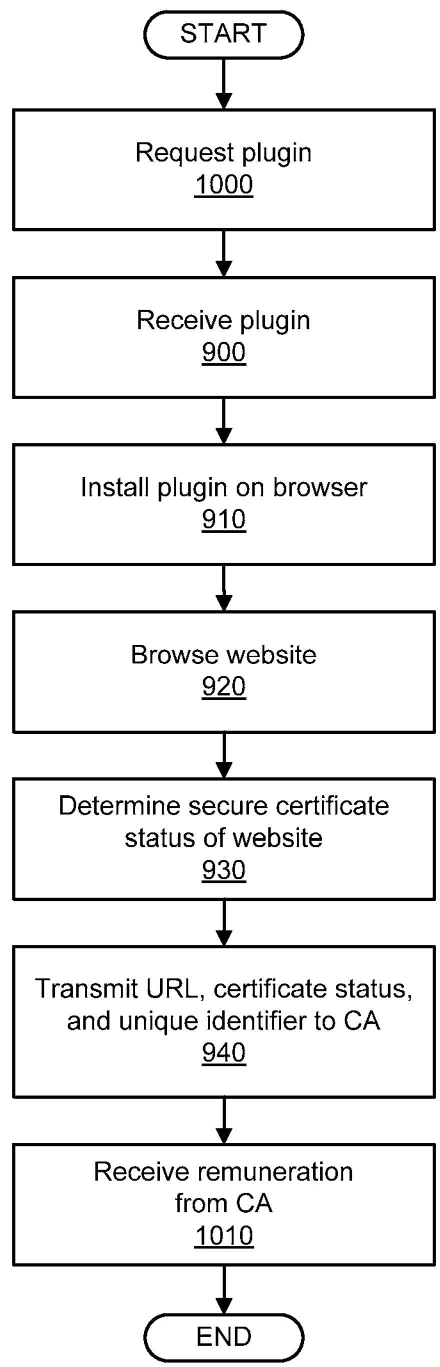
FIG. 10 is a flow diagram illustrating a possible embodiment of a method for determining website secure certificate status via a partner browser plugin.

FIG. 10 illustrates an example embodiment that builds upon the method shown in FIG. 9 and further comprises the steps of requesting the plugin 104 (Step 1000), perhaps by the computing device 106 and from a domain name registrar or a certificate authority having an affiliate program. The plugin 104 request (Step 1000) may be made, perhaps by the computing device 106, according to any request method and/or system component for making requests described in detail above (e.g., HTTP request/response, email message, SMS message, and/or a function call/response on an API). The illustrated method also comprises receiving remuneration from the domain registrar or the certificate authority after the domain registrar or the certificate authority sells a secure certificate-related service to an individual or an entity having control of the website 107 (Step 1010). Remuneration may be received (Step 1010) after a secure certificate is sold to an individual or entity having control of the website 107. The remuneration may comprise any financial payment including, but not limited to, a percentage share of the secure certificate sales price, a fixed fee, and/or a periodic payment for being a partner 103 (e.g., an affiliate member) and may be paid via electronic funds transfer, perhaps to a partner's 103 banking account. Alternatively, the partner 103 may be paid in any conventional manner including, but not limited to, mailing a check.

An Example Use of Methods and Systems for Determining Website Secure Certificate Status Via a Partner Browser Plugin.

As a non-limiting example, an Internet user may decide to join a certificate authorities' affiliate program, which may allow him to assist in generating sales leads for the certificate authority and receive payment for sales traceable to his referrals. To do so, the Internet user may become a partner 103 with the certificate authority, perhaps via the certificate authorities' website (first website 103). Upon signing up with the certificate authority, the partner 103 may be assigned a unique identifier 113, such as an affiliate member number, that subsequently may be used to track his referrals.

The certificate authority, in an effort to generate sales leads, may store a browser plugin 104 on a server 100 (Step 700) for download by its partners 103. As described in detail above, the plugin 104 may comprise software configured (e.g., programmed) to determine the secure certificate status 112 of a websites 107 browsed in a partner's 103 browser 105 and transmit related data back to the certificate authority for use as a sales lead.

To download the plugin 104, the partner 103 may navigate to the certificate authorities' website 103 via the browser 105 on his desktop computer (computing device 106). He then may request the browser plugin 104 by clicking a virtual button on the first website 103 entitled "request plugin" (Step 1000). When "clicked" by the partner 103, the button may transmit a HTTP request to a request receipt module 400 running on a server 100 communicatively coupled to the Internet.

The request then may be received by the certificate authorities' server 100 (Step 710). Upon receipt, a plugin coding module 401 running on the server 100 may automatically code a copy of the plugin 104 with the requesting partner's 103 unique identifier 113 (Step 720) by setting available in the plugin's 104 code to the partner's 103 unique affiliate member number. The coded plugin 104 then may be transmitted (by a plugin transmission module 402 also running on the server 100) back to the partner 103 (Step 730) as a hyperlink in an HTTP response to the partner's 103 request. The hyperlink, when clicked, may automatically download the plugin 104 to the partner's 103 computing device 106 for installation on its browser 105 (Step 910).

Once installed, the plugin 104 may monitor websites 107 browsed in the browser 105 (Step 920) and automatically determine the secure certificate status 112 of browsed websites (Step 930) by reading the expiration dates of the websites' 107 SSL certificates. If the plugin 104 identifies a website 107 having a SSL certificate that will expire with a predetermined timeframe (e.g., within 30 days), it may transmit the website's URL 111, the SSL certificate's expiration date (i.e., its secure certificate status 112), and the partner's 103 unique affiliate member number (i.e., unique identifier 113) to a status receipt module 109 running on the certificate authorities' server 100 (Step 940). Other information, such as the date and/or time that a determination is made, also may be transmitted by the plugin 104.

Upon receiving such information (Step 740), the status receipt module 109 may store the SSL certificate's expiration date (i.e., its secure certificate status 112), and the partner's 103 unique affiliate member number (i.e., unique identifier 113) in a database 110 on the certificate authorities' server 100. The database 110 may be accessible to the certificate authorities' sales personnel via an internal sales website 201 hosted on the server 100. The stored data may be used to contact the website 107 owner or operator to provide an SSL certificate renewal via the certificate authority.

Alternatively, the data stored in the database 110 may be accessed by a secure certificate sales module 200 running on the server 100. The secure certificate sales module 200 may contact the website 107 owner or operator (the website 107 owner or operator may be determined by querying the WHOIS database) with an offer to provide a valid secure certificate, perhaps via an email message with a link to the sales page certificate authorities' first website 103. If the certificate authority receives a request for a secure certificate and a certificate signing request from a website 107 owner or operator, it may then verify that the website 107 is actually controlled by the owner or operator, generate and transmit a SSL certificate to the owner or operator, and collect payment (Step 800).

Because the partner 103 who referred the SSL certificate sale has been tracked through the above process by his unique identifier 113, the certificate authority then may pay the partner 103 a commission for the sale (Step 810) by electronically transferring funds into the partner's bank account. Alternatively, the partner 103 may be paid in any conventional manner including, but not limited to, mailing a check.

Other embodiments and uses of the above inventions will be apparent to those having ordinary skill in the art upon consideration of the specification and practice of the inventions disclosed herein. The specification and examples given should be considered exemplary only, and it is contemplated that the appended claims will cover any other such embodiments or modifications as fall within the true scope of the inventions.

The Abstract accompanying this specification is provided to enable the United States Patent and Trademark Office and the public generally to determine quickly from a cursory inspection the nature and gist of the technical disclosure and in no way intended for defining, determining, or limiting the present inventions or any of its embodiments.

The inventions claimed are:

1. A method, comprising:

A) storing, on at least one server computer communicatively coupled to a network, a plugin configured to, when installed on a browser running on a computing device, determine a secure certificate status for a website browsed in said browser;

B) receiving, by one of more of said at least one server computer, a request from a partner for said plugin, said partner having a unique identifier;

C) coding, by one of more of said at least one server computer, said plugin with said unique identifier for said partner;

D) transmitting, by one of more of said at least one server computer, said plugin coded with said unique identifier to said partner; and E) receiving, by one of more of said at least one server computer, and from said plugin coded with said unique identifier:

i) a uniform resource locator for said website having said secure certificate status determined by said plugin;

ii) said secure certificate status; and iii) said unique identifier for said partner.

2. The method of claim 1, wherein said secure certificate status comprises a no certificate status, an expired certificate status, a soon-to-be expired certificate status, or an invalid certificate status.

3. The method of claim 1, wherein said secure certificate status comprises a status of a secure socket layer certificate.

4. The method of claim 1, further comprising: selling a secure certificate-related service to an individual or an entity having control of said website.

5. The method of claim 4, further comprising: paying a remuneration to said partner after selling said secure certificate-related service to said individual or said entity having control of said website.

6. The method of claim 1, wherein said partner comprises a participant in an affiliate program.

7. The method of claim 6, wherein said unique identifier comprises an affiliate member number.

8. The method of claim 7, wherein said coding step C) comprises embedding said affiliate member number in a software component of said plugin.

9. The method of claim 1, wherein said request from said partner for said plugin comprises a HTTP request to one or more of said at least one server computer.

10. The method of claim 9, wherein said plugin coded with said unique identifier is transmitted to said partner via an HTTP response to said HTTP request.

11. The method of claim 1, wherein said request from said partner for said plugin comprises a function call on an application programming interface running on one or more of said at least one server computer.

* * * * *